UNITED STATES PATENT OFFICE.

ARTHUR ZART, OF OPLADEN, AND HUGO SCHWEITZER, OF LEVERKUSEN, NEAR COLOGNE, GERMANY, ASSIGNORS TO SYNTHETIC PATENTS CO., INC., OF NEW YORK, N. Y., A CORPORATION OF NEW YORK.

AZO DYES.

1,114,844. Specification of Letters Patent. Patented Oct. 27, 1914.

No Drawing. Application filed December 3, 1913. Serial No. 804,407.

*To all whom it may concern:*

Be it known that we, ARTHUR ZART and HUGO SCHWEITZER, doctors of philosophy, chemists, citizens of the German Empire, residing at Opladen and Leverkusen, near Cologne-on-the-Rhine, Germany, have invented new and useful Improvements in Azo Dyes, of which the following is a specification.

We have found that new and valuable azo dyestuffs can be obtained by coupling the diazo compounds of diaminosulfonic acids e. g. para-phenylenediamin sulfonic acid which contain in one or both amino groups a nitroarylacidyl group or an acidylaminoarylacidyl group e. g.

with pyrazolone compounds which can be obtained from aminothiazole compounds by condensing their hydrazins with acetoacetic ester, etc., reducing the nitro group or splitting off the acidyl radical by saponification.

The new products are after being dried and pulverized in the shape of their alkaline salts generally yellowish powders soluble in water. Upon reduction with stannous chlorid and hydrochloric acid they are broken up into an aromatic diaminosulfonic acid substituted by an aminoarylacidyl radical and an aminopyrazolone compound derived from an aromatic thiazole product and substituted by the radical of such thiazole product. They dye cotton in yellowish shades, which by diazotation and development on fiber with beta-naphthol are converted into reddish-yellow shades fast to washing.

In order to illustrate the new process more fully the following example is given, the parts being by weight: 337 parts of meta-nitrobenzoyl-para-phenylenediamin sulfonic acid are diazotized with 69 parts of sodium nitrite and hydrochloric acid and the diazotized derivative is combined with 401 parts of 1-dehydrothiotolyl-3-methyl-5-pyrazolone sulfonic acid dissolved in a solution of sodium carbonate. 450 parts of crystalline sodium sulfid are added to it. Subsequently the mixture is boiled up and the dyestuff is salted out with common salt, filtered off and dried. It dyes cotton a yellowish shade which on development with beta-naphthol changes into a reddish-yellow fast to washing.

The new dyestuff is in the shape of its sodium salt a yellow powder having in a free state most probably the formula:

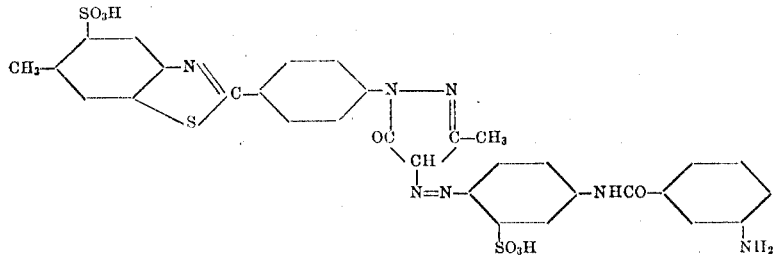

soluble in water with a yellow coloration, yielding upon reduction with stannous chlorid and hydrochloric acid meta-aminobenzoyl-para-phenylenediamin sulfonic acid, 1 - dehydrothiotolyl - 3 - methyl - 4 - amino - 5-pyrazolone sulfonic acid.

Other of the above mentioned components may be used such as e. g. 1-para-nitrobenzoyl-1.3-phenylenediamin - 4 - sulfonic acid, 1 - meta - nitro - para - anisoyl-1.4-phenylenediamin-3-sulfonic acid, 4-meta-nitro-benzoyl - 4.4' - diaminodiphenylurea - 3.3' - disulfonic acid, 4-para-nitro-benzoyl-4.4'-diaminostilbenedisulfonic acid, 4-meta-nitrobenzoyl-4.4'-diaminodiphenyl-3.3'-disulfonic acid, 1-meta'-nitrobenzoyl-meta-aminobenzoyl-1.4-phenylenediamin - 3 - sulfonic acid, mono-meta-nitrobenzoyl-1.5-naphthylenediamin-3-sulfonic acid, pyrazolone from the hydrazin of primulin sulfonic acid and acetoacetic - ester, 1 - dehydrothiotolyl-5-pyrazolone-3-carboxylic acid, pyrazolone obtained from the hydrazin of the para-aminophenyl-1.2-naphthothiazole-7-sulfonic acid and aceto-acetic ester.

We claim:

1. The new azo dyestuffs which are after being dried and pulverized in the shape of their alkaline salts yellowish powders soluble in water, yielding upon reduction with stannous chlorid and hydrochloric acid an aromatic diaminosulfonic acid substituted by an aminoaryl-acidyl radical and an aminopyrazolone compound substituted by an aromatic thiazole radical; dyeing cotton in yellowish shades which can be converted by diazotation and by development with beta-naphthol into reddish-yellow shades fast to washing, substantially as described.

2. The new azo dyestuffs which are after being dried and pulverized in the shape of their alkaline salts yellowish powders soluble in water, yielding upon reduction with stannous chlorid and hydrochloric acid a phenylenediamin sulfonic acid substituted by an aminoarylacidyl radical and an aminopyrazolone compound substituted by an aromatic thiazole radical; dyeing cotton in yellowish shades which can be converted by diazotation and by development with beta-naphthol into reddish-yellow shades fast to washing, substantially as described.

3. The new azo dyestuffs which are after being dried and pulverized in the shape of their alkaline salts yellowish powders soluble in water, yielding upon reduction with stannous chlorid and hydrochloric acid a para-phenylenediamin sulfonic acid substituted by an aminoarylacidyl radical and an aminopyrazolone compound substituted by an aromatic thiazole radical; dyeing cotton in yellowish shades which can be converted by diazotation and by development with beta-naphthol into reddish-yellow shades fast to washing, substantially as described.

4. The new azo dyestuffs which are after being dried and pulverized in the shape of their alkaline salts yellowish powders soluble in water, yielding upon reduction with stannous chlorid and hydrochloric acid an aromatic diamino sulfonic acid substituted by an aminobenzoyl radical and an aminopyrazolone compound substituted by an aromatic thiazole radical; dyeing cotton in yellowish shades which can be converted by diazotation and by development with beta-naphthol into reddish-yellow shades fast to washing, substantially as described.

5. The new azo dyestuffs which are after being dried and pulverized in the shape of their alkaline salts yellowish powders soluble in water, yielding upon reduction with stannous chlorid and hydrochloric acid a phenylenediamin sulfonic acid substituted by an aminobenzoyl radical and an aminopyrazolone compound substituted by an aromatic thiazole radical; dyeing cotton in yellowish shades which can be converted by diazotation and by development with beta-naphthol into reddish-yellow shades fast to washing, substantially as described.

6. The new azo dyestuffs which are after being dried and pulverized in the shape of their alkaline salts yellowish powders soluble in water, yielding upon reduction with stannous chlorid and hydrochloric acid a para-phenylenediamin sulfonic acid substituted by an amino-benzoyl radical and an aminopyrazolone compound substituted by an aromatic thiazole radical; dyeing cotton in yellowish shades which can be converted by diazotation and by development with beta-naphthol into reddish-yellow shades fast to washing, substantially as described.

7. The new azo dyestuffs which are after being dried and pulverized in the shape of their alkaline salts yellowish powders soluble in water, yielding upon reduction with stannous chlorid and hydrochloric acid an aromatic diamino sulfonic acid substituted by an aminoarylacidyl radical and a 4-aminopyrazolone compound substituted by an aromatic thiazole radical; dyeing cotton in yellowish shades which can be converted by diazotation and by development with beta-naphthol into reddish-yellow shades fast to washing, substantially as described.

8. The new azo dyestuffs which are after being dried and pulverized in the shape of their alkaline salts yellowish powders soluble in water, yielding upon reduction with stannous chlorid and hydrochloric acid an aromatic diamino sulfonic acid substituted by an aminoarylacidyl radical and a 4-aminopyrazolone compound substituted in 1-position by an aromatic thiazole radical; dyeing cotton in yellowish shades which can be converted by diazotation and by development with beta-naphthol into reddish-yellow shades fast to washing, substantially as described.

9. The new azo dyestuffs which are after being dried and pulverized in the shape of their alkaline salts yellowish powders soluble in water, yielding upon reduction with stannous chlorid and hydrochloric acid a phenylenediamin sulfonic acid substituted by an aminoarylacidyl radical and a 4-aminopyrazolone compound substituted in 1-position by an aromatic thiazole radical; dyeing cotton in yellowish shades which can be converted by diazotation and by development with beta-naphthol into reddish-yellow shades fast to washing, substantially as described.

10. The new azo dyestuffs which are after being dried and pulverized in the shape of their alkaline salts yellowish powders soluble in water, yielding upon reduction with stannous chlorid and hydrochloric acid a para-phenylenediamin sulfonic acid substituted by an aminoarylacidyl radical and a 4-aminopyrazolone compound substituted in 1-position by an aromatic thiazole radical; dyeing cotton in yellowish shades which can be converted by diazotation and by development with beta-naphthol into reddish-yellow shades fast to washing, substantially as described.

11. The new azo dyestuffs which are after being dried and pulverized in the shape of their alkaline salts yellowish powders soluble in water, yielding upon reduction with stannous chlorid and hydrochloric acid a phenylenediamin sulfonic acid substituted by an aminobenzoyl radical and a 4-aminopyrazolone compound substituted in 1-position by an aromatic thiazole radical; dyeing cotton in yellowish shades which can be converted by diazotation and by development with beta-naphthol into reddish-yellow shades fast to washing, substantially as described.

12. The new azo dyestuff having in the shape of its sodium salt most probably the formula:

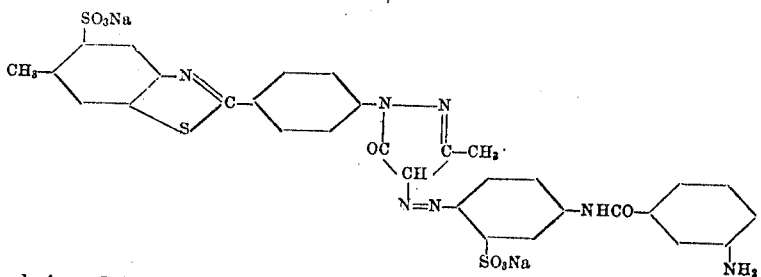

which is after being dried and pulverized a yellow powder soluble in water with a yellow coloration; yielding upon reduction with stannous chlorid and hydrochloric acid meta-aminobenzoyl-para-phenylenediamin sulfonic acid, 1-dehydrothiotolyl-3-methyl-4-amino-5-pyrazolone sulfonic acid; dyeing cotton a yellow which can be developed with beta-naphthol into a reddish-yellow shade, substantially as described.

In testimony whereof we have hereunto set our hands in the presence of two subscribing witnesses.

ARTHUR ZART.
HUGO SCHWEITZER.

Witnesses:
  GOTTFRIED ROWHNGHOVEN,
  RUDOLF POLDENVALE.

Copies of this patent may be obtained for five cents each, by addressing the "Commissioner of Patents, Washington, D. C."